United States Patent
Seo

(10) Patent No.: US 11,924,951 B2
(45) Date of Patent: Mar. 5, 2024

(54) WIRELESS POWER TRANSMISSION SYSTEM COMPRISING TRANSPARENT HEATING ELEMENT, AND HEAD MOUNTED DEVICE INCLUDING SAME

(71) Applicant: ITED INC., Daejeon (KR)

(72) Inventor: Jee-Hoon Seo, Namyangju-si (KR)

(73) Assignee: ITED INC., Daejeon (KR)

( * ) Notice: Subject to any disclaimer, the term of this patent is extended or adjusted under 35 U.S.C. 154(b) by 873 days.

(21) Appl. No.: 16/964,930

(22) PCT Filed: Jun. 8, 2018

(86) PCT No.: PCT/KR2018/006503
§ 371 (c)(1),
(2) Date: Jul. 24, 2020

(87) PCT Pub. No.: WO2019/156290
PCT Pub. Date: Aug. 15, 2019

(65) Prior Publication Data
US 2021/0045199 A1    Feb. 11, 2021

(30) Foreign Application Priority Data
Feb. 12, 2018   (KR) .................. 10-2018-0017268

(51) Int. Cl.
*H05B 6/36*     (2006.01)
*G02B 27/00*    (2006.01)
(Continued)

(52) U.S. Cl.
CPC ........... *H05B 6/36* (2013.01); *G02B 27/0006* (2013.01); *H01F 27/2804* (2013.01); *H02J 7/02* (2013.01);
(Continued)

(58) Field of Classification Search
CPC . H02J 50/005; H02J 7/02; H02J 50/10; H05B 6/10; H05B 6/36; H05B 3/84;
(Continued)

(56) References Cited

U.S. PATENT DOCUMENTS 10,588,178 B1 *  3/2020  Nelson .................. H05B 3/141
2018/0090992 A1 *  3/2018  Shrivastava ............ H02J 50/20

FOREIGN PATENT DOCUMENTS

JP    2010-186566 A    8/2010
JP    2017-178695 A   10/2017
(Continued)

OTHER PUBLICATIONS

International Search Report and Written Opinion dated Oct. 30, 2018 in International Application No. PCT/KR2018/006503, in 9 pages. (*English translation of ISR.*).

*Primary Examiner* — Dana Ross
*Assistant Examiner* — Kuangyue Chen
(74) *Attorney, Agent, or Firm* — Knobbe, Martens, Olson & Bear, LLP

(57) ABSTRACT

This application relates to a wireless power transmission system. In one aspect, the wireless power transmission system includes a power transmitting module that provides wireless power to a power receiving module. The power receiving module can include transparent heat generating elements that are heated by power wirelessly received from the power transmitting module. The power receiving module can include a first coil pattern. The power transmitting module can include a battery and a second coil pattern that can wirelessly transmit power supplied from the battery to the first coil pattern of the power receiving module. The wireless power transmission system can be included in a head mount device such as a fire mask, a gas mask, or a helmet.

20 Claims, 11 Drawing Sheets

(51) Int. Cl.
  *H01F 27/28* (2006.01)
  *H02J 7/02* (2016.01)
  *H02J 50/00* (2016.01)
  *H02J 50/10* (2016.01)
  *H05B 6/10* (2006.01)

(52) U.S. Cl.
  CPC ............ *H02J 50/005* (2020.01); *H02J 50/10* (2016.02); *H05B 6/10* (2013.01)

(58) Field of Classification Search
  CPC ........ H05B 2203/013; H05B 2203/011; H01F 27/2804; H01F 38/14; G02B 27/0006
  See application file for complete search history.

(56) References Cited

FOREIGN PATENT DOCUMENTS

| | | |
|---|---|---|
| KR | 10-1443201 B1 | 9/2014 |
| KR | 10-1563317 B1 | 10/2015 |
| KR | 10-164253 B1 | 7/2016 |

\* cited by examiner

WIRELESS POWER TRANSMISSION SYSTEM COMPRISING TRANSPARENT HEATING ELEMENT, AND HEAD MOUNTED DEVICE INCLUDING SAME

The present application is a U.S. national phase application under 35 U.S.C. § 371 of International Application No. PCT/KR2018/006503, filed on Jun. 8, 2018, which claims the benefit of Korean Patent Application No. 10-2018-0017268 filed on Feb. 12, 2018, in the Korean Intellectual Property Office, the entire disclosure of each of which is incorporated herein by reference.

BACKGROUND

1. Field

The present invention relates to a wireless power transmission system including a transparent heat generating element and a head mount device having the same.

2. Description of Related Art

Wireless power transmission or wireless energy transfer technology that wirelessly transmits electric energy to a desired device has already begun to use in electric motors or transformers using the electromagnetic induction principle since 1800s. After then, methods of transmitting electrical energy by radiating electromagnetic waves such as radio waves or lasers have also been attempted. Electric toothbrushes and some wireless shavers, which are commonly used, are actually charged using the electromagnetic induction principle. To date, energy transfer methods using the wireless system includes magnetic induction, magnetic resonance, and long-distance transmission technology using short-wavelength radio frequencies.

On the other hand, when a helmet, a gas mask, or a fire mask is used, a viewing part made of a transparent material and disposed in a front side thereof can be filled with moisture due to users breathing, ambient temperature, or ambient humidity, etc., which prevents the users view.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object of the present invention is to provide a head mount device including a wireless power transmission system that helps secure a users view by using a wireless power transmission technology.

A wireless power transmission system according to an embodiment of the present invention includes a power receiving module and a power transmitting module.

The power receiving module may include a base substrate, a humidity sensor on the base substrate, a plurality of transparent heat generating elements on the base substrate, a first bus bar disposed on the base substrate and electrically connected to at least some of the plurality of transparent heat generating elements, a second bus bar disposed on the base substrate to be spaced apart from the first bus bar and electrically connected to at least some of the plurality of transparent heat generating elements, and a first coil pattern electrically connected to the first bus bar and the second bus bar.

The power transmitting module may include a battery, a control circuit capable of controlling the battery and the humidity sensor, and a second coil pattern electrically connected to the control circuit and transmitting the power supplied from the battery to the first coil pattern in an electromagnetic inductive coupling method.

A head mount device according to an embodiment of the present invention may include a frame part accommodating a users head and a viewing part disposed at a position corresponding to users eyes to allow the user to see outside.

The viewing part may include a base substrate, a humidity sensor on the base substrate, a plurality of transparent heat generating elements on the base substrate, a first bus bar disposed on the base substrate and electrically connected to at least some of the plurality of transparent heat generating elements, a second bus bar disposed on the base substrate to be spaced apart from the first bus bar and electrically connected to at least some of the plurality of transparent heat generating elements, and a first coil pattern electrically connected to the first bus bar and the second bus bar.

The frame part may include a battery, a control circuit capable of controlling the battery and the humidity sensor, and a second coil pattern electrically connected to the control circuit and transmitting the power supplied from the battery to the first coil pattern in an electromagnetic inductive coupling method.

According to an embodiment of the present invention, there is provided a head mount device including a wireless power transmission system capable of wirelessly providing power based on a measured ambient humidity to a transparent heat generating element.

Accordingly, generation of moisture may be prevented in a part of the wireless power transmission system and the head-mounted device and even if moisture is generated, the generated moisture may be quickly removed.

DETAILED DESCRIPTION

Figure 1:
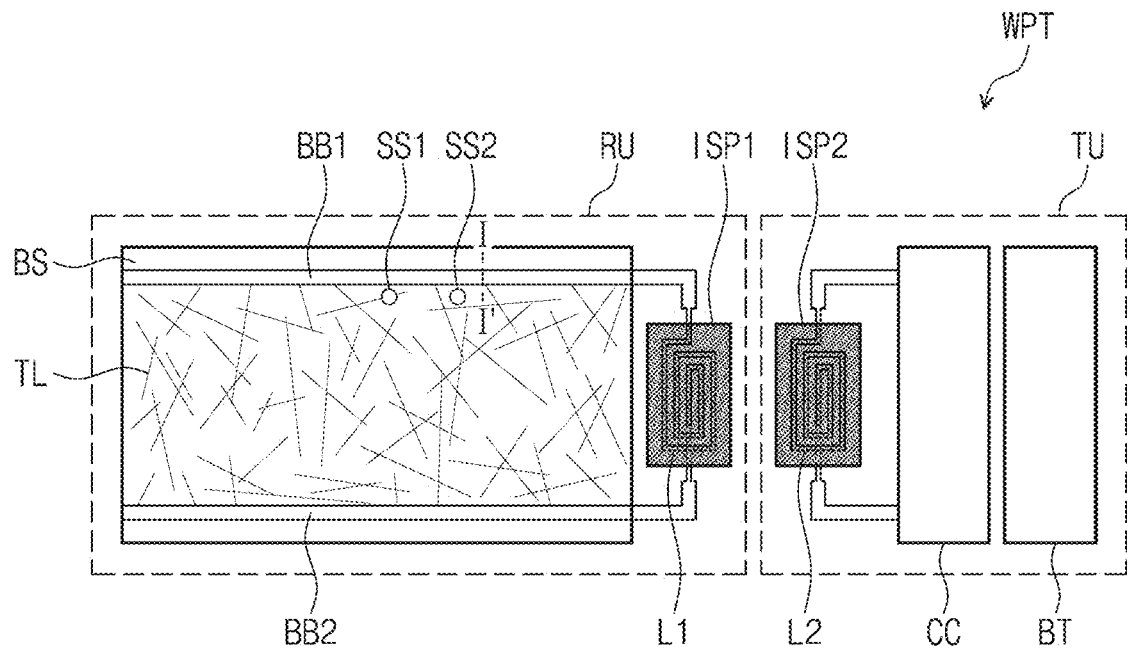
FIG. 1 and FIG. 2 are diagrams illustrating wireless power transmission systems according to an embodiment of the present invention.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The terms used in the description are intended to describe certain embodiments only, and shall by no means restrict the present disclosure. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

In the drawings, the proportion and dimensions of components are exaggerated for effective description of technical content. The term of "and/or" includes all combinations of one or more that the associated configurations may define.

Embodiments of the disclosure will be described below in more detail with reference to the accompanying drawings, in which those components are rendered the same reference number that are the same or are in correspondence, regardless of the figure number, and redundant explanations are omitted.

Figure 2:
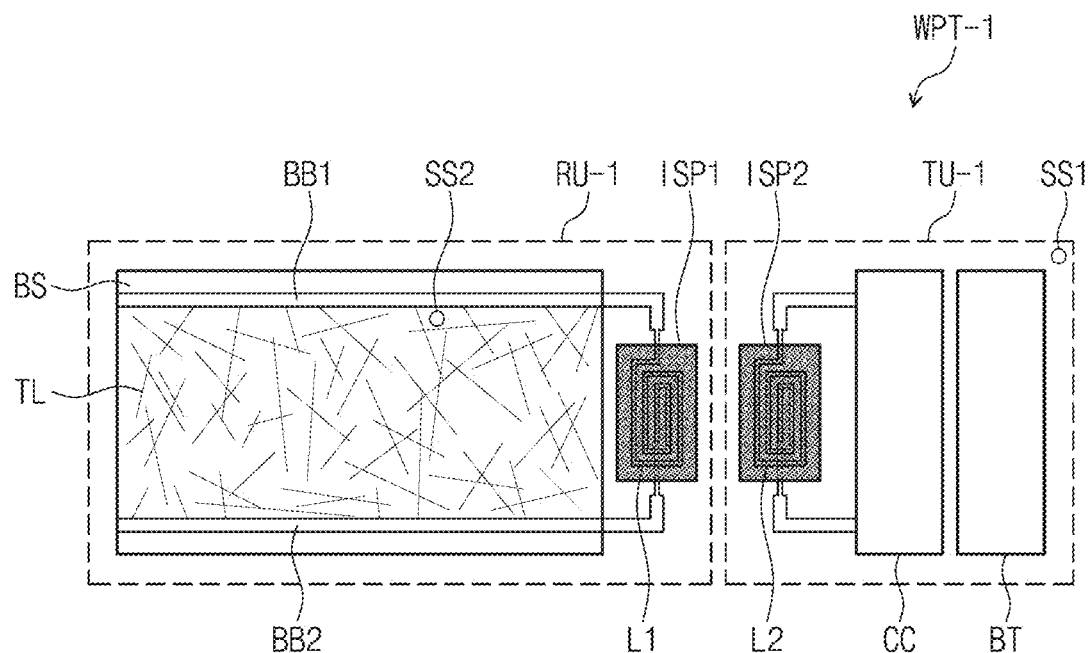

FIG. 1 and FIG. 2 are diagrams illustrating wireless power transmission systems WPT and WPT-1 according to an embodiment of the present invention.

Referring to FIG. 1, a wireless power transmission system WPT may include a power receiving module RU and a power transmitting module TU.

The power receiving module RU may include a base substrate BS, a plurality of transparent heat generating elements TL, a first bus bar BB1, a second bus bar BB2, a first coil pattern L1, a first insulating part ISP1, and sensors SS1 and SS2.

The base substrate BS may include a flexible film, glass, or plastic. Any material included in the base substrate BS may be sufficient as long as the plurality of transparent heat generating elements TL, the first bus bar BB1, and the second bus bar BB2 can be disposed. However, it is not limited thereto.

The base substrate BS may have transparent properties. Accordingly, the base substrate BS may be able to transmit light incident from the outside.

The transparent heat generating element TL may be disposed on the base substrate BS. The transparent heat generating element TL may be silver nanowire (AgNW), indium zinc oxide (IZO), or indium tin oxide (ITO). The transparent heat generating element TL may include a commonly used transparent heat generating element material or transparent electrode material. However, it is not limited thereto.

At least some of the transparent heat generating elements TL may be electrically connected to other adjacent transparent heat generating elements.

The first bus bar BB1 and the second bus bar BB2 may be disposed on the base substrate BS. Each of the first bus bar BB1 and the second bus bar BB2 may be electrically connected to at least some of the transparent heat generating elements TL.

The first bus bar BB1 and the second bus bar BB2 may be spaced apart from each other. The second bus bar BB2 may be electrically connected to the first bus bar BB1 through the transparent heat generating elements TL.

In one embodiment of the present invention, the first bus bar BB1 and the second bus bar BB2 may be printed circuit boards. In this case, conductive patterns disposed on each one surface of the first bus bar BB1 and the second bus bar BB2 may be electrically connected to the transparent heat generating elements TL.

In one embodiment of the present invention, the first bus bar BB1 and the second bus bar BB2 may be silver nano paste.

In an embodiment of the present invention, the first bus bar BB1 and the second bus bar BB2 may be any conductive material including copper (Cu).

The first bus bar BB1 and the second bus bar BB2 may include various materials capable of transmitting power provided from the outside to the transparent heat generating elements TL. However, it is not limited thereto.

The first coil pattern L1 may be electrically connected to the first bus bar BB1 and the second bus bar BB2. The first coil pattern L1 may be, for example, an inductor. The first coil pattern L1 may receive power provided from the outside by an electromagnetic inductive coupling method.

In one embodiment of the present invention, when the first bus bar BB1 and the second bus bar BB2 are respectively printed circuit boards, the first coil pattern L1 may be arranged on the printed circuit board extending from the first bus bar BB1 or the second bus bar BB2. When the first coil pattern L1 is formed by patterning a printed circuit board in a flat shape, there may be an advantage that the bus bars BB1 and BB2 and the first coil pattern L can be manufactured at once.

The first insulating part ISP1 may cover the first coil pattern L1 to insulate the first coil pattern L1 from the power transmitting module TU. In one embodiment of the present invention, the first insulating part ISP1 may be resin, silicone, or polymer, but is not limited thereto.

The sensors SS1 and SS2 may be disposed on the base substrate BS.

The humidity sensor SS1 may measure an ambient humidity. The humidity sensor SS1 may determine whether moisture or fog is generated in the base substrate BS.

The temperature sensor SS2 may measure an ambient temperature. The temperature sensor SS2 may be determine a temperature of the base substrate BS before being heated by the transparent heat generating elements TL or a temperature of the base substrate BS after being heated by the transparent heat generating elements TL.

The humidity sensor SS1 and the temperature sensor SS2 may be disposed adjacent to the first bus bar BB1 or the second bus bar BB2. The humidity sensor SS1 and the temperature sensor SS2, unlike the transparent heat generating elements TL, may be well recognized by the human eye. Therefore, when the humidity sensor SS1 and the temperature sensor SS2 are disposed adjacent to the first bus bar BB1 or the second bus bar BB2, it may prevent the humidity sensor SS1 and the temperature sensor SS2 from being viewed even when the wireless power transmission system WPT according to an embodiment of the present invention is applied to a head mound device or the like.

The power transmitting module TU may include a battery BT, a control circuit CC, a second coil pattern L2, and a second insulating part ISP2.

The battery BT may provide power to the control circuit CC and the like.

The control circuit CC may be electrically connected to the battery BT and the sensors SS1 and SS2. Accordingly, the control circuit CC may be able to control the battery BT and the sensors SS1 and SS2 and may exchange power with them.

The control circuit CC may exchange signals with the sensors SS1 and SS2 by wire or wirelessly.

The second coil pattern L2 may be electrically connected to the control circuit CC. The second coil pattern L2 may be, for example, an inductor. The second coil pattern L2 may transmit power supplied from the battery BT to the first coil pattern L1 in an electromagnetic inductive coupling method.

The second insulating part ISP2 may cover the second coil pattern L2 to insulate the second coil pattern L2 from the first coil pattern L1. In one embodiment of the present invention, the second insulating part ISP2 may be resin, silicone, or polymer, but it is not limited thereto.

As the first coil pattern L1 and the second coil pattern L2 are covered by the first insulating part ISP1 and the second insulating part ISP2, respectively, even if the distance between the first coil pattern L1 and the second coil pattern L2 is close each other, the first coil pattern L1 and the second coil pattern L2 may not be shorted to each other. Thus, the distance between the first coil pattern L1 and the second coil pattern L2 may be made close, and, accordingly, power may be efficiency transferred from the second coil pattern L2 to the first coil pattern L1.

Referring to FIG. 2, a wireless power transmission system WPT-1 may include a power receiving module RU-1 and a power transmitting module TU-1.

In the wireless power transmission system WPT-1 shown in FIG. 2, unlike FIG. 1, the humidity sensor SS1 may be included in the power transmitting module TU-1, not in the power receiving module RU-1.

Descriptions of other components are substantially the same as those described in FIG. 1 and thus are omitted.

Figure 3:
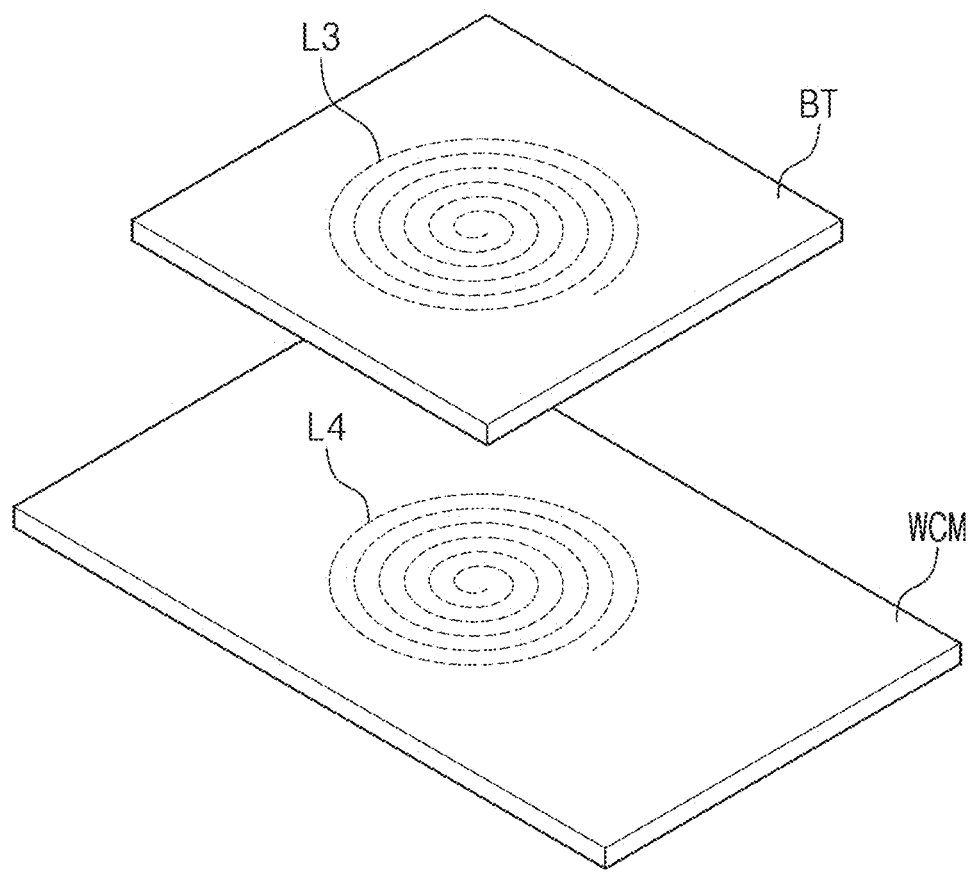
FIG. 3 is a diagram illustrating a battery and a wireless charging module according to an embodiment of the present invention.

FIG. 3 is a diagram illustrating a battery BT and a wireless charging module WM according to an embodiment of the present invention.

The battery BT included in the power transmitting module (TU, TU-1, see FIGS. 1 and 2) may be charged by receiving wireless power from the wireless charging module WCM.

For example, the battery BT may include a third coil pattern L3 and the wireless charging module WCM may include a fourth coil pattern L4. Accordingly, the third coil pattern L3 may receive power in an electromagnetic inductive coupling method from the fourth coil pattern L4. Various techniques for charging an existing battery wirelessly may be applied. However, it is not limited thereto.

FIG. 4A, FIG. 4B, FIG. 4C, and FIG. 4D are diagrams illustrating cross-sectional views taken along line I-I' in FIG. 1, respectively.

Figure 4A:
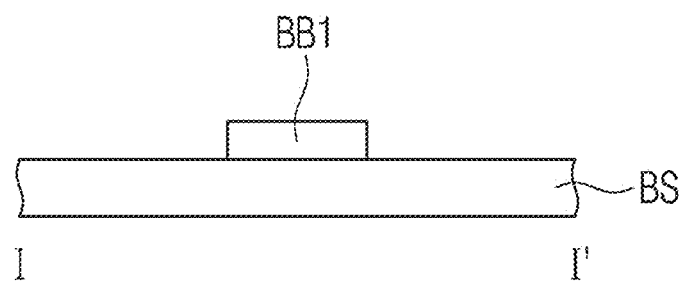
FIG. 4A, FIG. 4B, FIG. 4C, and FIG. 4D are diagrams illustrating cross-sectional views taken along line I-I' in FIG. 1, respectively.

Referring to FIG. 4A, the first bus bar BB1 may be mounted directly on the base substrate BS to be electrically connected to the transparent heat generating elements TL. Although not shown, the second bus bar BB2 may also be mounted on the base substrate BS in the same manner as the first bus bar BB1.

Figure 4B:
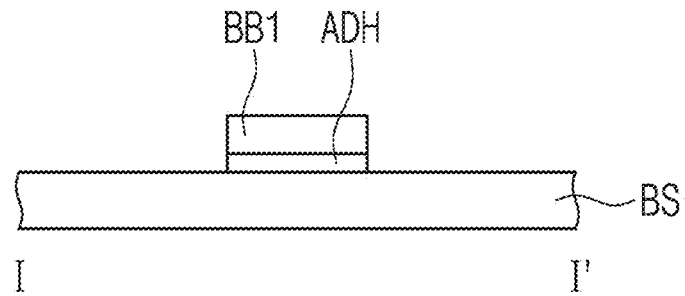

Referring to FIG. 4B, the first bus bar BB1 may be mounted on the base substrate BS by a conductive adhesive member ADH to be electrically connected to the transparent heat generating elements TL. Although not shown, the second bus bar BB2 may also be mounted on the base substrate BS in the same manner as the first bus bar BB1.

Here, the conductive adhesive member ADH may be an adhesive including silver (Ag), such as an anisotropic conductive film (ACF) and Ag adhesive, or any conductive material.

Figure 4C:
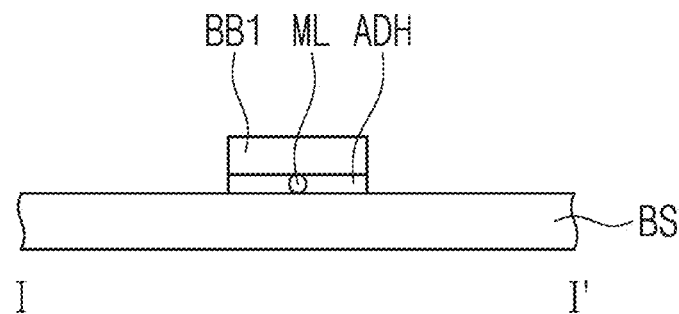

Referring to FIG. 4C, a conductive line ML for adhesion may be added to the diagram of FIG. 4B. The conductive line ML may include a metal material capable of transmitting an electrical signal.

The first bus bar BB1 may be electrically connected to the transparent heat generating elements TL by the conductive adhesive member ADH and the conductive line ML for adhesion. Although not shown, the second bus bar BB2 may also be disposed on the base substrate BS in the same manner as the first bus bar BB1.

Figure 4D:
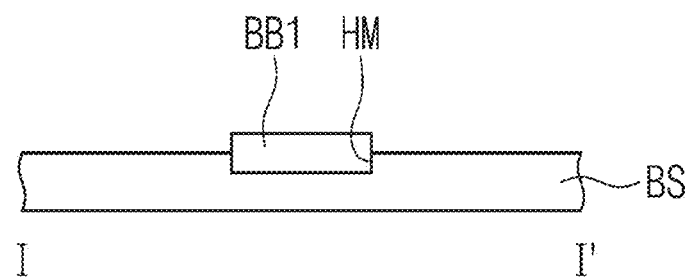

Referring to FIG. 4D, a concave groove HM may be defined in the base substrate BS. The first bus bar BB1 may be disposed to correspond to the groove HM to be electrically connected to the transparent heat generating elements TL. Although not shown, the second bus bar BB2 may also be disposed on the base substrate BS in the same manner as the first bus bar BB1.

Figure 5A:
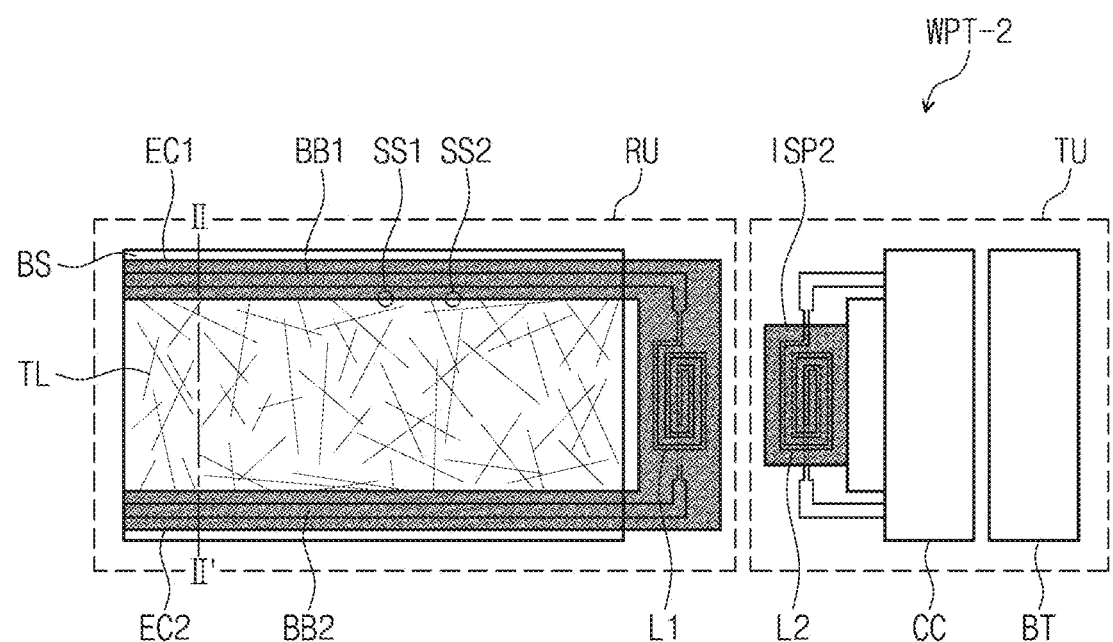
FIG. 5A is a diagram illustrating a wireless power transmission system according to an embodiment of the present invention.
Figure 5B:
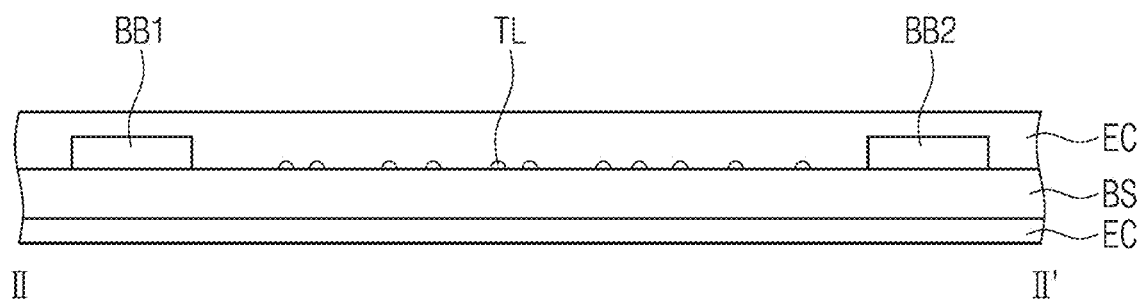
FIG. 5B is a diagram illustrating a cross-sectional view taken along line II-II' in FIG. 5A.

FIG. 5A is a diagram illustrating a wireless power transmission system WPT-2 according to an embodiment of the present invention. FIG. 5B is a diagram illustrating a cross-sectional view taken along line II-II' in FIG. 5A.

A first bus bar BB1 may be covered by a first sealing member EC1 and a second bus bar BB2 may be covered by a second sealing member EC2. Accordingly, as the bus bars BB1 and BB2 are sealed by the sealing members EC1 and EC2, the bus bars BB1 and BB2 may be protected from external moisture. In addition, generation of sparks may be prevented in the bus bars BB1 and BB2.

Figure 6A:
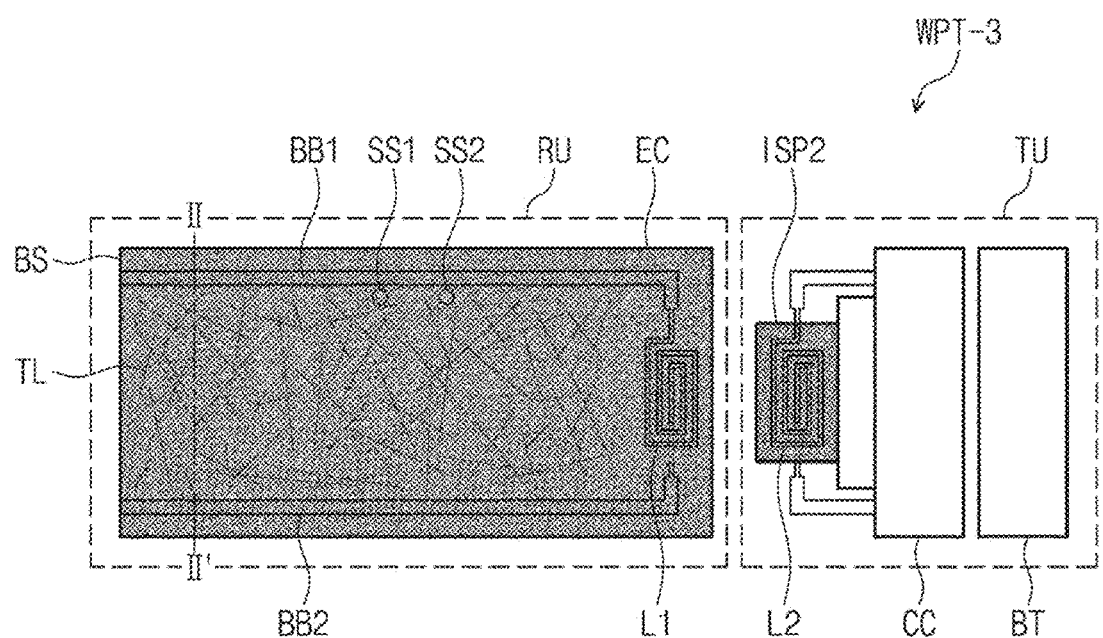
FIG. 6A is a diagram illustrating a wireless power transmission system according to an embodiment of the present invention.
Figure 6B:
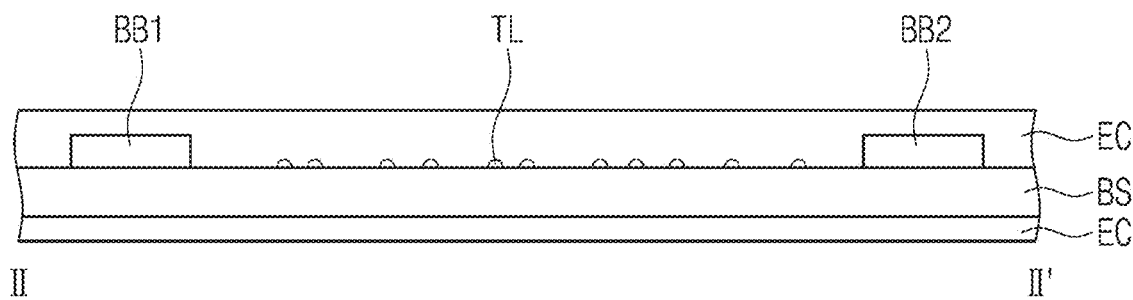
FIG. 6B is a diagram illustrating a cross-sectional view taken along line II-II' in FIG. 5C.

FIG. 6A is a diagram illustrating a wireless power transmission system WPT-3 according to an embodiment of the present invention. FIG. 6B is a diagram illustrating a cross-sectional view taken along line II-II' in FIG. 5C.

Referring to FIG. 6A and FIG. 6B, a base substrate BS, bus bars BB1 and BB2, and transparent heat generating elements TL may be entirely covered and sealed by a sealing member EC. Particularly, the sealing member EC may be disposed on a front surface and/or a back surface of the base substrate BS.

Figure 7A:
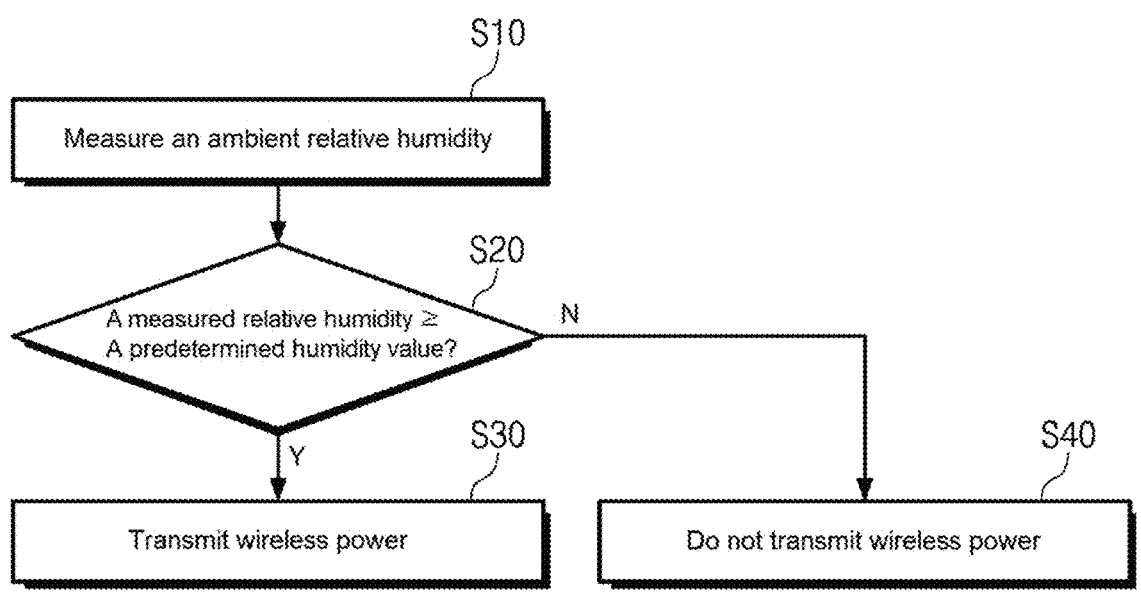
FIG. 7A, FIG. 7B, and FIG. 7C are flowcharts illustrating a process of operating a wireless power transmission system according to an embodiment of the present invention.
Figure 7B:
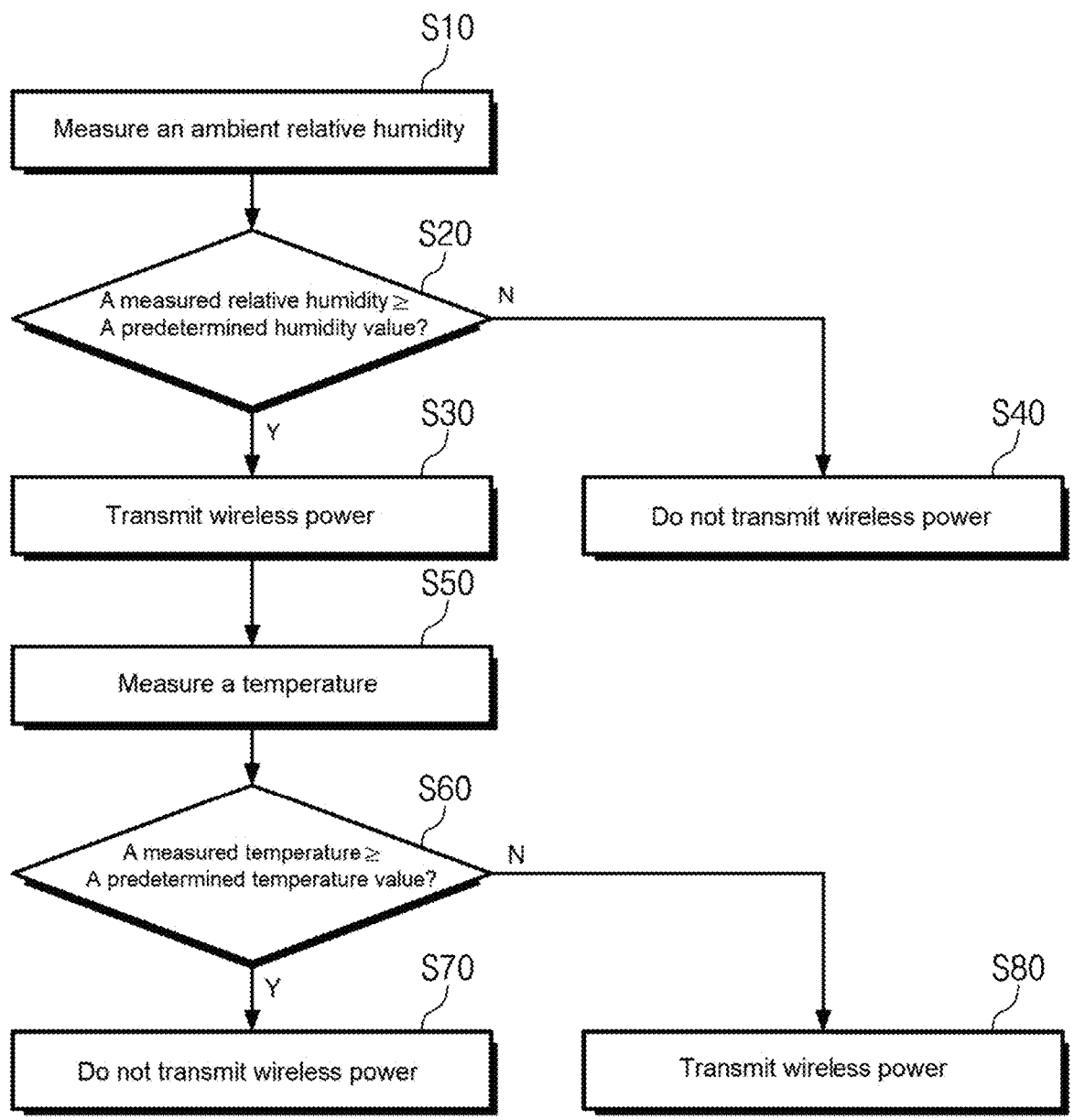
Figure 7C:
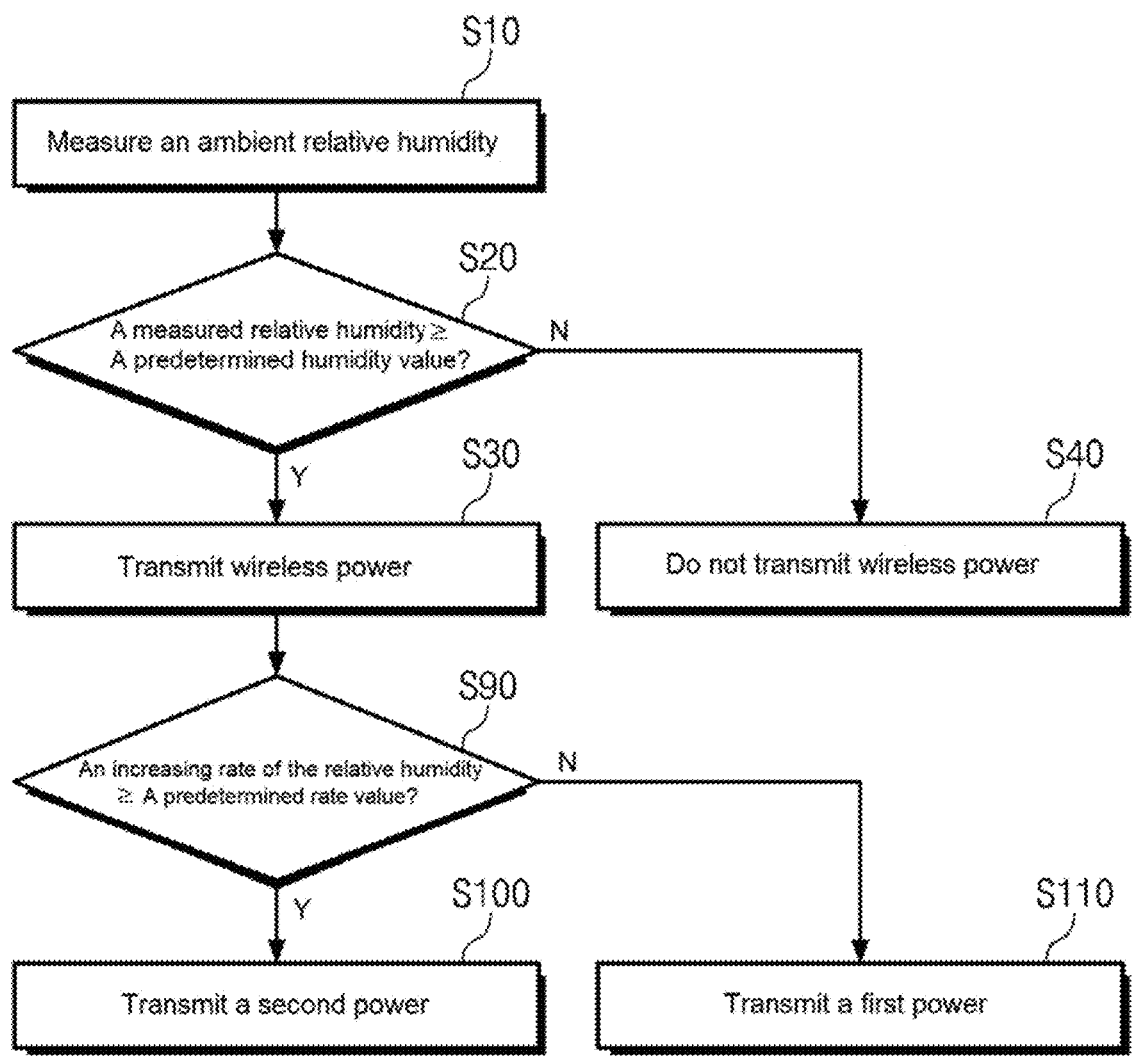

FIG. 7A, FIG. 7B, and FIG. 7C are flowcharts illustrating a process of operating a wireless power transmission system WPT, WPT-1, WPT-2, WPT-3 according to an embodiment of the present invention.

Referring to FIG. 7A, a humidity sensor SS1 may measure an ambient relative humidity at a predetermined time interval (S10). The predetermined time interval may be, for example, 1 to 10 seconds.

A control circuit CC may determine whether the relative humidity measured by the humidity sensor SS1 is greater than or equal to a predetermined humidity value (S20). The predetermined humidity value may be, for example, 50% to 70%.

When the relative humidity measured by the humidity sensor SS1 is greater than or equal to a predetermined humidity value, a power transmitting module TU may wirelessly transmit power to a power receiving module RU (S30). On the other hand, when the relative humidity measured by the humidity sensor SS1 is less than the predetermined humidity value, the power transmitting module TU does not wirelessly transmit power to the power receiving module RU (S40).

When the humidity value is between 50% and 70% before reaching 100%, the power may be transmitted wirelessly in advance to increase the temperature of the transparent heat generating elements TL of the power receiving module RU, thereby preventing the base substrate BS from being moisturized or fogged or eliminating moisture or fog quickly even if moisture or fog is generated. This may be defined as pre-heating.

Referring to FIG. 7B, subsequent steps (S50 to S80) may have been added from the steps of FIG. 7A.

When the power receiving module RU receives wireless power and the temperature of the transparent heat generating elements TL is increased, a temperature sensor SS2 may measure such a temperature change (S50).

The control circuit CC may determine whether the temperature measured by the temperature sensor SS2 is equal to or higher than a predetermined temperature value (S60). In one embodiment of the present invention, the predetermined temperature value may be a fixed specific value. In another embodiment of the present invention, the predetermined temperature value may be a value that is about 4° C. to 10° C. greater than the temperature at which the power transmitting module TU starts transmitting power to the power receiving module RU.

When the temperature measured by the temperature sensor SS2 is equal to or higher than the predetermined temperature value, the power transmitting module TU may stop transmitting wireless power to the power receiving module RU (S70). On the other hand, when the temperature measured by the temperature sensor SS2 is less than the predetermined temperature value, the power transmitting module TU may continuously transmit wireless power to the power receiving module RU (S80).

In one embodiment of the present invention, the predetermined temperature value may be 40° C. or less. When the temperature of the transparent heat generating elements TL is greater than 40° C., a user who uses it may feel discomfort or may be burned at a temperature higher than his/her body temperature.

Referring to FIG. 7C, subsequent steps S90 to S110 may have been added from the steps of FIG. 7A.

When the relative humidity is periodically measured by the humidity sensor SS1 and an increasing rate of the relative humidity is greater than or equal to a predetermined rate value, the power transmitting module TU may transmit a second power to the power receiving module RU. (S100). On the other hand, when the increasing rate of the relative humidity is less than the predetermined rate value, the power transmitting module TU may transmit a first power having a value less than the second power to the power receiving module RU.

In this way, it is possible to provide a wireless power transmission system that can be more actively optimized for changes in the surrounding environment by changing the amount of the power in response to the change rate of the relative humidity.

Figure 8:
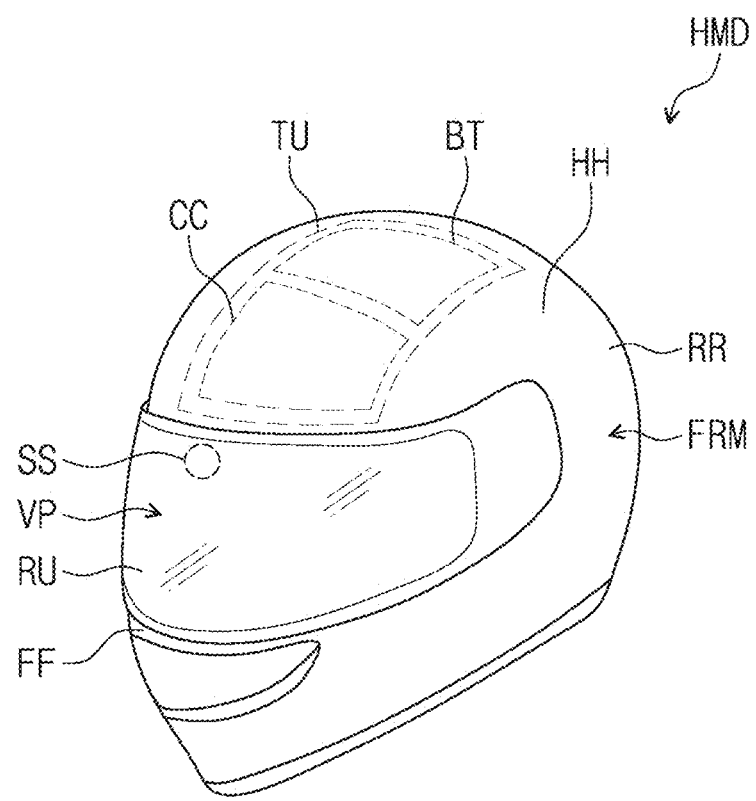
FIG. 8 is a diagram illustrating a head mount device to which the wireless power transmission system shown in FIG. 1 is applied.

FIG. 8 is a diagram illustrating a head mount device HMD to which the wireless power transmission system WPT shown in FIG. 1 is applied.

Figure 9:
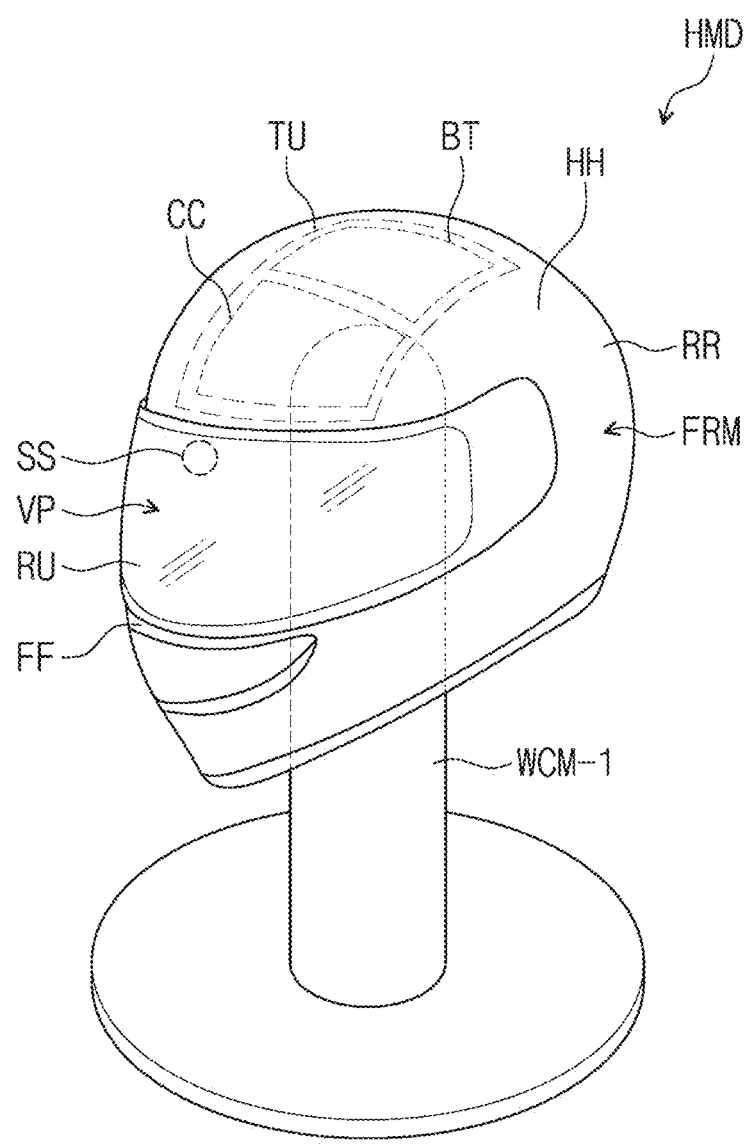
FIG. 9 is a diagram illustrating that the head mount device shown in FIG. 8 is mounted.

FIG. 9 is a diagram illustrating that the head mount device HMD shown in FIG. 8 is mounted.

Referring to FIG. 8, the head mount device HMD may include a frame part FRM and a viewing part VP.

The frame FRM may accommodate a users head, allowing the user to secure the head mount device HMD to the users head.

A user wearing the head mount device HMD may see the outside through the viewing part VP. The sensor SS may include a humidity sensor SS1 and/or a temperature sensor SS2 and may be disposed on the viewing part VP.

The frame part FRM may include a front part FF facing a user's face, a rear part RR facing a users back head, and an upper part HH facing a users head. The upper part HH may connect the front part FF and the rear part RR.

The viewing part VP may include the power receiving module RU of the wireless power transmission system WPT illustrated in FIG. 1.

In one embodiment of the present invention, the viewing part VP may be implemented by attaching the power receiving module RU having a flexible property to a glass or transparent plastic substrate.

In another embodiment of the present invention, the viewing part VP may be implemented as the power receiving module RU itself having a rigid property.

The frame part FRM may include a power transmitting module TU. In FIG. 8, the power transmitting module TU is disposed on the upper part HH of the frame part FRM, but is not limited thereto. The position in which the power transmitting module TU is disposed may be changed as necessary.

Referring to FIG. 9, when the head mount device HMD according to an embodiment of the present invention is mounted on a pillar-shaped wireless charging module WCM-1, the battery BT may be charged by receiving wireless power by the wireless charging module WCM-1.

The battery BT may be disposed on the upper part HH where the head mount device HMD comes into contact with the wireless charging module WCM-1 and, thus, may be easily and wirelessly supplied with power.

Depending on the mounting type between the wireless charging module WCM-1 and the head mount device HMD, the position where the battery BT is disposed may be changed.

While it has been described with reference to particular embodiments, it is to be appreciated that various changes and modifications may be made by those skilled in the art without departing from the spirit and scope of the embodiment herein, as defined by the appended claims and their equivalents. Accordingly, examples described herein are only for explanation and there is no intention to limit the disclosure. The scope of the present disclosure should be interpreted by the following claims and it should be interpreted that all spirits equivalent to the following claims fall with the scope of the present disclosure.

INDUSTRIAL AVAILABILITY

There are many problems in that light transmittance is poor due to fog or moisture formed on the surface of a transparent object. Therefore, the present invention relating to a technology for removing fog or moisture formed in the surface of a transparent object has high industrial applicability.

What is claimed is:

1. A wireless power transmission system comprising:
a power receiving module; and
a power transmitting module configured to wirelessly transmit power to the power receiving module, wherein the power receiving module comprises:
- a base substrate;
- a humidity sensor arranged on the base substrate;
- a plurality of transparent heat generating elements arranged on the base substrate;
- a first bus bar arranged on the base substrate and electrically connected to at least some of the plurality of transparent heat generating elements;
- a second bus bar arranged on the base substrate to be spaced apart from the first bus bar and electrically connected to at least some of the plurality of transparent heat generating elements; and
- a first coil pattern electrically connected to the first bus bar and the second bus bar, and wherein the power transmitting module comprises:
- a battery;
- a control circuit configured to control the battery and the humidity sensor of the power receiving module; and
- a second coil pattern electrically connected to the control circuit and configured to transmit power supplied from the battery to the first coil pattern of the power receiving module via electromagnetic inductive coupling.

2. The wireless power transmission system of claim 1, wherein the plurality of transparent heat generating elements comprise silver nanowires.

3. The wireless power transmission system of claim 2, wherein the base substrate is transparent.

4. The wireless power transmission system of claim 1, wherein the humidity sensor is arranged adjacent to the first bus bar or the second bus bar.

5. The wireless power transmission system of claim 1, wherein each of the first bus bar and the second bus bar comprises a printed circuit board.

6. The wireless power transmission system of claim 5, wherein the first coil pattern is patterned on the printed circuit board.

7. The wireless power transmission system of claim 1, wherein the first bus bar and the second bus bar are adhered to the base substrate by a conductive adhesive member.

8. The wireless power transmission system of claim 1, wherein two concave grooves are defined in the base substrate and wherein the first bus bar and the second bus bar are respectively arranged in the two concave grooves.

9. The wireless power transmission system of claim 1, further comprising a first insulating part covering the first coil pattern and a second insulating part covering the second coil pattern.

10. The wireless power transmission system of claim 1, further comprising a first sealing member sealing the first bus bar and a second sealing member sealing the second bus bar.

11. The wireless power transmission system of claim 10, wherein the first sealing member or the second sealing member covers the plurality of transparent heat generating elements and is arranged on a front part or a rear part of the base substrate.

12. The wireless power transmission system of claim 1, further comprising a wireless charging module configured to wirelessly transmit power to the battery so as to charge the battery with the transmitted power.

13. The wireless power transmission system of claim 1, wherein the humidity sensor is configured to measure an ambient relative humidity at a predetermined time interval.

14. The wireless power transmission system of claim 13, wherein the power transmitting module is configured to not transmit power to the power receiving module when the measured ambient relative humidity is less than a predetermined humidity value, and configured to transmit power to the power receiving module when the measured ambient relative humidity is equal to or greater than the predetermined humidity value.

15. The wireless power transmission system of claim 14, wherein the predetermined humidity value is 50% to 70%.

16. The wireless power transmission system of claim 14, wherein the power transmitting module is configured to transmit a first power to the power receiving module when an increasing rate of the measured ambient relative humidity is less than a predetermined rate value, and configured to transmit a second power having a value greater than the first power to the power receiving module when the increasing rate of the measured ambient relative humidity is greater than or equal to the predetermined rate value.

17. The wireless power transmission system of claim 14, wherein the power receiving module further comprises a temperature sensor configured to measure an ambient temperature at a predetermined time interval, wherein when the measured ambient temperature is greater than or equal to a predetermined temperature value, the power transmitting module is configured to not transmit power to the power receiving module even when the measured ambient relative humidity is greater than or equal to the predetermined humidity value.

18. A head mount device comprising:
- a frame part configured to accommodate a user's head; and
- a viewing part arranged at a position corresponding to the user's eyes to see the outside, wherein the viewing part comprises:
- a base substrate;
- a humidity sensor arranged on the base substrate;
- a plurality of transparent heat generating elements arranged on the base substrate;
- a first bus bar arranged on the base substrate and electrically connected to at least some of the plurality of transparent heat generating elements;
- a second bus bar arranged on the base substrate to be spaced apart from the first bus bar and electrically connected to at least some of the plurality of transparent heat generating elements; and
- a first coil pattern electrically connected to the first bus bar and the second bus bar, and wherein the frame part comprises:
- a battery;
- a control circuit configured to control the battery and the humidity sensor of the viewing part; and
- a second coil pattern electrically connected to the control circuit and configured to transmit power supplied from the battery to the first coil pattern of the viewing part via electromagnetic inductive coupling.

19. The head mount device of claim 18, wherein the frame part comprises a front part configured to face the user's face, a rear part configured to face the user's back head, and an upper part configured to face the user's head and connecting the front part and the rear part, and wherein the battery is arranged at a position corresponding to the upper part.

20. The head mount device of claim 19, wherein the battery is configured to be charged by power wirelessly received from an external charging device that contacts the upper part.

* * * * *